March 21, 1933.  J. M. NALLE  1,901,924
FLEXIBLE JOINT
Filed March 28, 1929
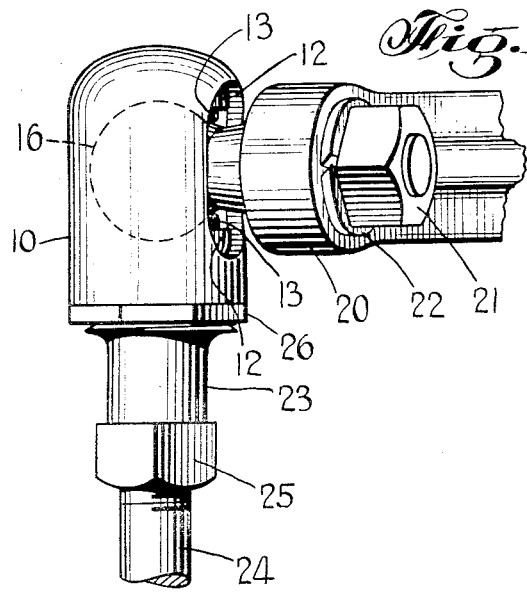
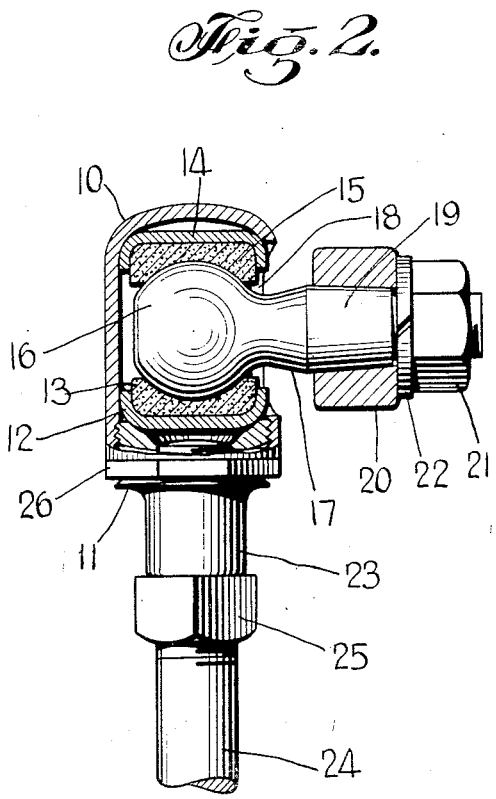
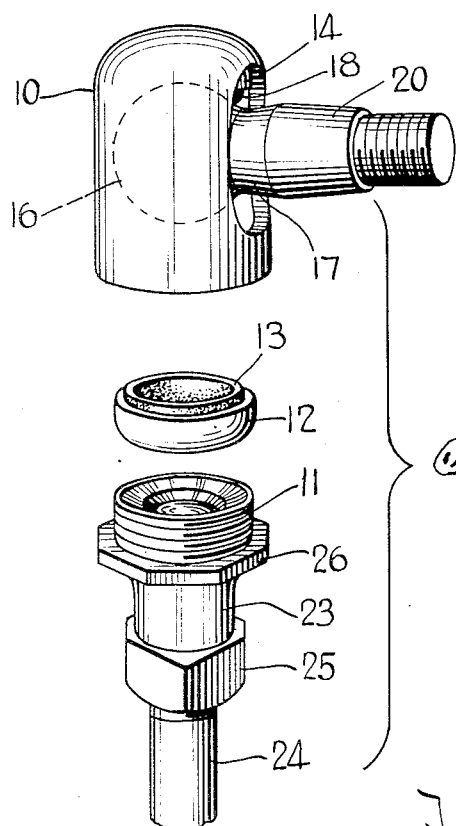
INVENTOR.
John M. Nalle
BY
ATTORNEY Patented Mar. 21, 1933

1,901,924

UNITED STATES PATENT OFFICE

JOHN M. NALLE, OF FAIRFIELD, CONNECTICUT, ASSIGNOR TO AMERICAN CHAIN COMPANY, INC., A CORPORATION OF NEW YORK

FLEXIBLE JOINT

Application filed March 28, 1929. Serial No. 350,480.

My invention relates to improvements in universal joints and has for an object to provide a joint of ball-and-socket type which can be manufactured at low cost and which will be stronger than universal joints of this type heretofore constructed.

Another object of this invention is to provide a universal joint in which the relatively moving parts are self-lubricated. To this end, the socket portion of the joint is provided with blocks of self-lubricating material which form bearings for the ball portion of the joint.

A self-lubricating bearing material comprising a mixture of graphite, copper and tin is suitable for the purpose. However, heretofore it has not been considered practicable to use such material in ball joints, because of its brittle and friable nature.

It is an object of my invention to provide means for reinforcing the blocks of self-lubricating material so as to overcome the danger of breakage and provide a universal joint with an ample margin of safety.

Universal joints of the ball and socket type have heretofore been constructed with a casing over the socket member having an opening in the side thereof large enough to permit of passing the ball of the drag member through this opening. It is an object of my invention to provide a construction of this general type in which the opening in the side of the socket casing will be too small to permit of passing the ball therethrough.

An advantage of this construction is that the opening may be formed by punching instead of drilling as heretofore, thus reducing the cost of manufacture.

Another advantage is that the construction is stronger because less material is cut away from the socket member.

A further advantage is found in the reduced exposure to dust and dirt due to the reduction in size of the opening.

A still further advantage lies in the direction of safety; for if by chance the bearing blocks should break the drag member would not pull out of the socket casing.

Another object of the invention is to provide a construction in which the parts may be readily assembled or taken apart as desired.

Other objects and advantages will appear in the following description of a preferred embodiment of my invention and thereafter the novelty and scope of the invention will be pointed out in the claims.

Referring to the drawing:

Figure 1 is a view in perspective showing my improved universal joint as used to connect a rod and a crank arm;

Fig. 2 is a side elevation of the same with a portion of the universal joint shown in section;

Fig. 3 is an expanded view in perspective of my improved universal joint.

As shown in the drawing, the socket portion of the joint comprises a casing member 10 of cylindrical form which is closed at one end and is open at the other. The open end is internally threaded to receive a screw plug 11. The inner face of the plug 11 is cupped to provide a seat for a cup member 12 in which is fitted a block 13 of self-lubricating bearing material. It will be understood that the block is held in the cup 12 by being pressed therein. The end wall of the casing 10 is rounded outward to provide a seat for a second cup member 14 in which is fitted a block of bearing material 15. The blocks 13 and 15 are provided respectively with depressions to form seats for the ball 16 of a drag member 17.

The casing 10 is provided with a slot 18 in one side thereof to admit of passing the shank 19 of the drag member 17 therethrough. The shank 19 is preferably formed with a tapered bearing surface to engage an eye in the end of a crank arm or other member 20, and is threaded at its outer end to receive a nut and washer 21 and 22 respectively, by which the member 20 is secured to the drag member.

The plug 11 is formed with a shank 23 which is centrally bored and threaded to receive a connecting rod 24, and a nut 25 on the rod 24 will secure the parts in desired adjustment. The plug is provided with a lock nut 26 by which it may be secured at such adjustment as to take up any slack in the bearings of the ball 16, providing a smoothly acting joint and preventing jamming of the parts.

The slot 18 in the side of the member 10 is too narrow to permit of passing the ball 16 therethrough, and the only way by which the ball may be introduced into the casing 10 is to pass the shank 19 through the open end of the casing and then through the slot 18. The slot is, therefore, made long enough and is disposed in proper relation to the open end of the casing 10 to permit of introducing the drag member therethrough.

The manner in which the parts are assembled is illustrated in Fig. 3. The cup 14 and bearing block 15 are first introduced into the casing 10, after which the shank of the drag member is passed through the open end of the casing and through the slot 18; then the other bearing member 13 in its cup 12 is introduced into the casing, and finally the plug 11 is screwed into the casing and locked by the nut 26 to hold the parts in proper relative position.

Because of the reinforcement provided by the cups 12 and 14, the bearing blocks will stand up under the strains which are likely to be imposed on the joint. If, however, the joint should be subjected to a severe shock it might result in the breaking of the bearing material, but in such case the ball end 16 could not pass out of the slot 18 and there would be no possibility for the members of the joint to come apart.

It will be understood that the particular construction described above is to be taken as illustrative and not limitative of my invention and that various changes in form, construction and arrangements of parts may be made without departing from the spirit and scope of my invention as described in the following claims:

I claim:

1. A flexible joint, comprising a casing closed at one end and open at the other and having an aperture at one side thereof, a plug adapted to close the open end of the casing, the plug and the closed end of the casing providing a pair of opposed seats, a pair of bearing members seated in said seats, and a drag member consisting of a head journaled between the bearing members and a shank projecting through said aperture, the aperture being too small to pass the head but being so disposed with relation to the open end of the casing that the drag member may be introduced through said open end and the shank passed through the aperture from the inside of the casing.

2. A flexible joint, comprising a casing closed at one end and open at the other and having an aperture at one side thereof, a plug adapted to close the open end of the casing, the plug and the closed end of the casing providing a pair of opposed seats, a pair of bearing members seated in said seats, a drag member consisting of a head journaled between the bearing members and a shank projecting through said aperture, the aperture being too small to pass the head but being so disposed with relation to the open end of the casing that the drag member may be introduced through said open end and the shank passed through the aperture from the inside of the casing, the plug being adjustable in the casing to force the bearing blocks into engagement with the head, and means for locking the plug at desired adjustment.

3. A flexible joint, comprising a casing closed at one end and open at the other and having an aperture at one side thereof, a plug adapted to close the open end of the casing, the plug and the closed end of the casing providing a pair of opposed seats, a pair of bearing members seated in said seats, a drag member consisting of a head journaled between the bearing members and a shank projecting through said aperture, the aperture being too small to pass the head but being so disposed with relation to the open end of the casing that the drag member may be introduced through said open end and the shank passed through the aperture from the inside of the casing, the plug being adjustable in the casing to force the bearing plugs into engagement with the head, and means for locking the plug at desired adjustment, the plug being also adapted for attachment to a connecting member.

4. A flexible joint, comprising a casing closed at one end and open at the other and having an aperture at one side thereof, a plug adapted to close the open end of the casing, the plug and the closed end of the casing providing a pair of opposed seats, a pair of bearing members seated in said seats, and a drag member consisting of a head journaled between the bearing members and a shank projecting through said aperture, the aperture being too small to pass the head but being so disposed with relation to the open end of the casing that the drag member may be introduced through said open end and the shank passed through the aperture from the inside of the casing, each bearing member consisting of a block of friable anti-friction material and a reinforcing cup into which the block is pressed.

5. A flexible joint comprising a socket member formed with two openings, one of the openings being confined to an end of said member and the other to a side of said member, and a drag member having a head journaled in the socket member and a shank projecting through the side opening, the latter opening being too small to pass said head and the end opening being of a size to permit of introducing the drag member therethrough and the shank through the side opening from the inside of the socket member.

6. A flexible joint comprising a socket member formed with two openings, one of the openings being confined to an end of said member and the other to a side of said member, a drag member having a head journaled in the socket member and a shank projecting through the side opening, the latter opening being too small to pass said head and the end opening being of a size to permit of introducing the drag member therethrough and the shank through the side opening from the inside of the socket member, and means for closing the end opening to retain the head in the socket member.

7. A flexible joint comprising a socket member formed with two openings, one of the openings being confined to an end of said member and the other to a side of said member, a drag member having a head journaled in the socket member and a shank projecting through the side opening, the latter opening being too small to pass said head and the end opening being of a size to permit of introducing the drag member therethrough and the shank through the side opening from the inside of the socket member, and a screw plug threaded into the end opening to retain the head in the socket member.

8. A flexible joint comprising a socket member formed with two openings, one of the openings being confined to an end of said member and the other to a side of said member, a drag member having a head journaled in the socket member and a shank projecting through the side opening, the latter opening being too small to pass said head and the end opening being of a size to permit of introducing the drag member therethrough and the shank through the side opening from the inside of the socket member, a plug adjustable in the end opening to retain the head in the socket member, and means for locking the plug at desired adjustment.

In testimony whereof, I have signed this specification.

JOHN M. NALLE.